United States Patent [19]

Sage

[11] Patent Number: 5,758,746

[45] Date of Patent: Jun. 2, 1998

[54] PUMP LUBRICATION EXPANSION TUBE

[75] Inventor: William L. Sage, Rogers, Ark.

[73] Assignee: Assembled Products Corporation, Rogers, Ak.

[21] Appl. No.: 610,465

[22] Filed: Mar. 4, 1996

[51] Int. Cl.⁶ ........................................................ F16N 3/00
[52] U.S. Cl. ............................ 184/96; 184/103; 116/227; 73/323
[58] Field of Search .................... 184/96, 97, 103.1, 184/103.2; 116/227; 73/323, 334; 417/63

[56] References Cited

U.S. PATENT DOCUMENTS

| | | | |
|---|---|---|---|
| 779,336 | 1/1905 | Wilkinson | 184/96 |
| 820,821 | 5/1906 | Pedersen | 184/96 |
| 952,611 | 3/1910 | Edwards . | |
| 953,675 | 3/1910 | Edwards . | |
| 1,095,654 | 5/1914 | McCanna | 184/96 |
| 1,250,664 | 12/1917 | Ronk . | |
| 1,367,630 | 2/1921 | Skelly . | |
| 1,942,450 | 1/1934 | Rennick | 184/96 |
| 2,607,225 | 8/1952 | Biscoe | 73/323 |
| 2,689,627 | 9/1954 | Woog . | |
| 2,755,629 | 7/1956 | Baisch | 73/323 |
| 3,103,816 | 9/1963 | Kawecki | 116/227 |
| 4,096,924 | 6/1978 | Lyden . | |
| 4,342,376 | 8/1982 | Lyden . | |
| 4,945,757 | 8/1990 | Schuster | 73/49.2 |
| 5,327,997 | 7/1994 | Nash, Jr. et al. . | |

*Primary Examiner*—Thomas E. Denion
*Attorney, Agent, or Firm*—Boyd D. Cox

[57] ABSTRACT

The invention is directed to lubrication of pumps, wherein due to relative space limitations, pumps oriented at various positions are provided sufficient oiling fluid to accommodate lubrication of cylinder surfaces preventing excess wear, such that an expansion tube projecting from and in secured operative communication with the crankcase of the existing pump is such that the tube having a graduated exterior surface is provided. The graduations are oriented in a parallel relationship relative to the axis of the tube, and permit ease of viewing of sufficient pump oil volume when such volume is visible via the graduations. The tube provides for a removable cap structure to permit the adding or removal of fluid relative to the pump crank case.

16 Claims, 2 Drawing Sheets

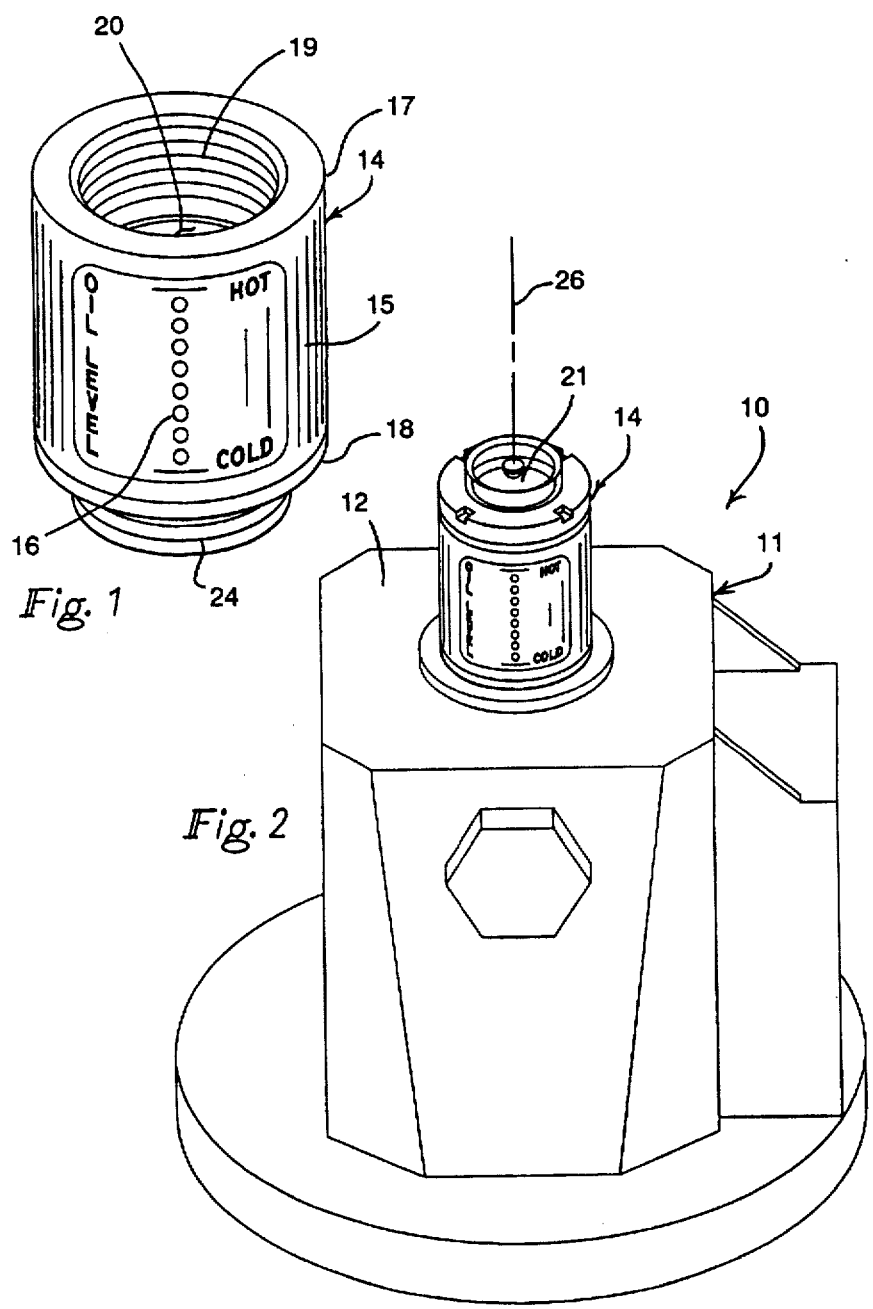

PUMP LUBRICATION EXPANSION TUBE

BACKGROUND OF THE INVENTION

1. Field of the Invention

The invention is directed to pump mechanisms, and more particularly pertains to the lubrication of pumping mechanisms such as piston, centrifugal, and the like pump constructions. In practical use of pumps, such pumps are positioned upon equipment in a manner not initially designed, such as a vertical pump oriented in a horizontal position and the like as an example. To this end, lubrication and maintenance of proper fluid levels for such lubrication are frequently neglected, with attendant premature wear of such pump equipment.

2. Description of the Prior Art

Prior art lubrication structure, including a sight tube, is indicated in the U.S. Pat. No. 952,611 to F. W. Edwards, wherein a sight tube structure is positioned in alignment and in series with a feed structure of an associated pump. In a like manner, the Edwards U.S. Pat. No. 953,675 is of similar construction.

U.S. Pat. No. 1,250,664 to F. C. Ronk sets forth a sight glass positioned at a distal end portion of an associated conduit and is arranged for the fluid level indication within an associated pump structure.

U.S. Pat. No. 4,096,924 issued to Frank J. Lyden sets forth an oiler assembly arranged for communication of a lubrication point within a lubrication feed line.

U.S. Pat. No. 4,342,376 issued to Frank J. Lyden is a further example of a constant level oiler having adjustable nozzles for establishing a working level oil within an oil chamber of an associated pump structure in association with a pump through an oil line assembly.

The prior art has heretofore failed to provide for a convenient and compact organization readily retrofit relative to existing pump structure, in a manner as indicated by the present invention and to this end, it is presented that the pump lubrication expansion tube structure of the invention improves and defines over prior art constructions.

SUMMARY OF THE INVENTION

The invention is directed to lubrication of pumps, wherein due to relative space limitations, pumps oriented at various positions are provided sufficient oiling fluid to accommodate lubrication of cylinder surfaces preventing excess wear, such that an expansion tube projecting from and in secured operative communication with the crankcase of the existing pump is such that the tube having a graduated exterior surface is provided. The graduations are oriented in a parallel relationship relative to the axis of the tube and permit ease of viewing of sufficient pump oil volume when such volume is visible via the graduations. The tube provides for a removable cap structure to permit the adding or removal of fluid relative to the pump crank case.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is a perspective illustration of the tube structure of the invention.

FIG. 2 is a perspective illustration of the pump having the sight member tube projecting therefrom.

DETAILED DESCRIPTION OF THE PREFERRED EMBODIMENT(S)

Figures 3, 4:
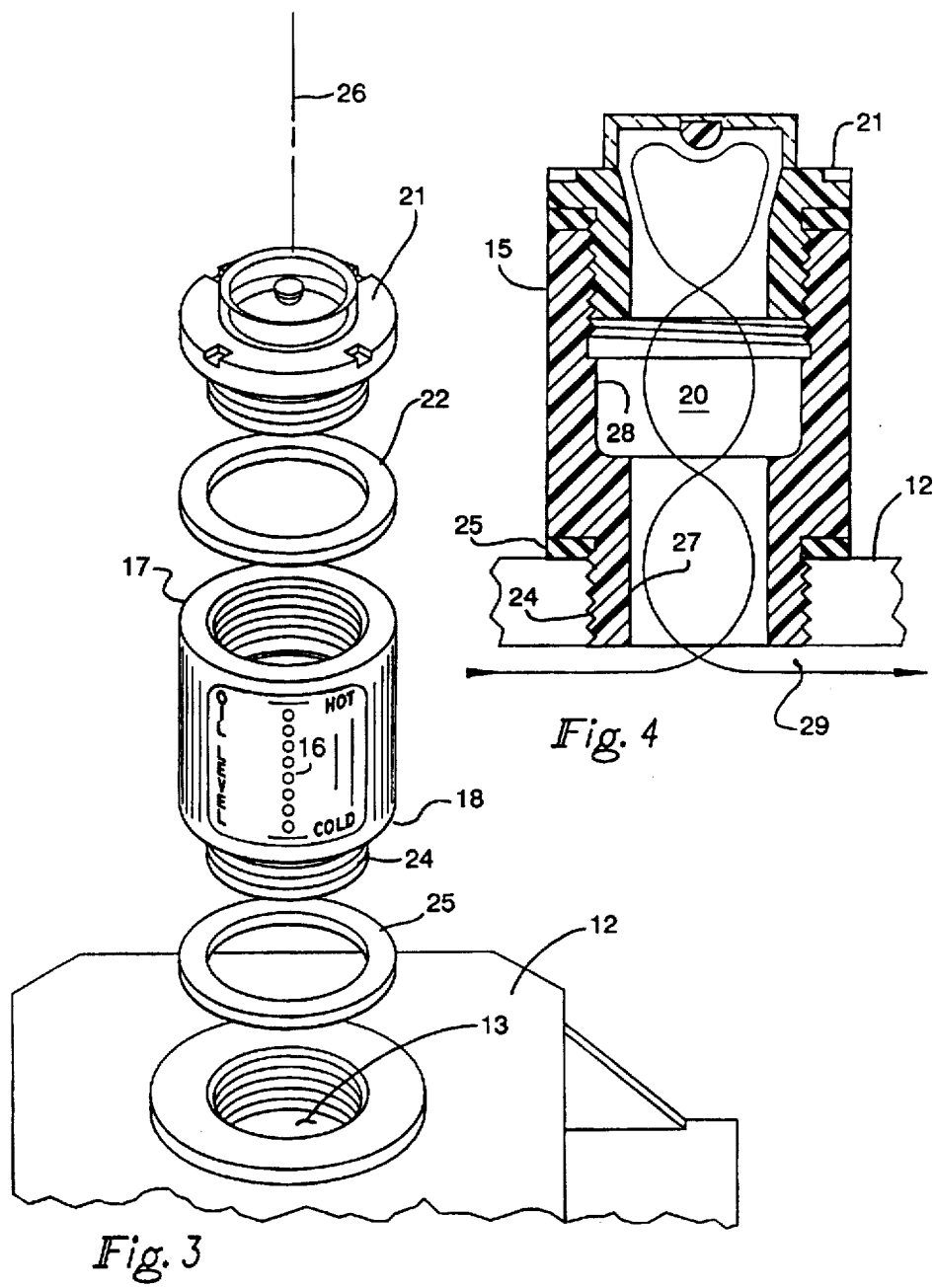
FIG. 3 is an exploded perspective illustration of the various components, their construction, and their interrelationship.
FIG. 4 is a cross-sectional illustration of the sight member or tube in operative secured relationship to the pump crankcase chamber.

Referring now to the drawings, which like reference numerals designate corresponding structure throughout the views, and referring particularly to FIGS. 1–4, a pump lubrication expansion tube 10 according to the preferred embodiment will now be described.

A pump 11 is provided such that an exterior wall 12 includes a threaded bore 13 in operative communication with the associated pump crankcase chamber 29 (see FIG. 4). If desired, such pumps 11 are provided with a sight glass, wherein the sight glass is removed, and wherein a sight member 14 as exemplified in tubular construction is secured to the bore 13. Such secured association may be operative through a threaded interconnection or other suitable mechanical connection. Alternatively, adhesives, fusing, welding, or the like may be employed as alternative interengagement of the sight member 14 to the associated pump 11. The sight member 14 in this manner provides for an expansion chamber indicated as a body cavity 20 for expansion of lubricant fluid within the pump crankcase chamber 29 to expand therein to thereby provide for viewing indication of proper lubricant fluid within the associated pump 11.

The sight member 14, as indicated, is typically formed with a translucent or transparent body, having a body portion 15 having imparted thereon a series of graduations 16. The graduations 16 extend proximate a body first end 17 extending to a body second end 18. Directed into the sight member 14 from the body first end 17 is a first end bore 19. The first end bore 19 is indicated as internally threaded to have selectively secured thereto a cap 21. The cap 21 provides access to the body cavity 20 for the extraction and replenishment of the lubricant fluid from within the pump crankcase chamber 29. Such extractions may be performed by a vacuum obstruction device (not shown), or alternatively fluid may be added to crankcase chamber 29 as necessary. The graduations that extend adjacent to the body second end 18 indicate are a lowermost limit of fluid that should be tolerated in operation of the pump 11. To this end, FIG. 4 indicates that during operation of the pump, fluid as viewed by the arrow is directed into the body cavity 20 from within the pump crankcase chamber 29. As and as the fluid is heated, the available fluid extends from the lowermost graduation adjacent the body second end 18 towards the body first end 17. This indicates a range from cold lubricant fluid to hot lubricant fluid relative to respective non-use and use of the pump 11 to effect heating of the lubricant fluid and its associated expansion.

A first sealing ring 22 is interposed between the cap 21 and the body first end 17 to provide a fluid sealing of the cap 21 to the sight member 14, wherein a projecting boss 24 extends from the body second end 18 arranged for securement to the pump bore 13. To this end, a second sealing ring 25 is interposed between the pump 11 and the body second end 18 extending about the projecting boss 24 for a further fluid impermeable relationship at a junction of the sight member 14 to the pump exterior wall 12.

Typically, the first end bore 19, the projecting boss 24, and the body cavity 20 are coaxially aligned about an axis 26, but this is not necessarily so as the sight member 14 may be of various geometric configurations as desired to extend from the pump 11, but the body cavity 20 as provided does mandate that the graduations 16 are oriented parallel to the axis 26 that is typically orthogonally oriented relative to the pump exterior wall 12. Further, the body cavity 20 includes a first diameter bore 27 extending along the projecting boss 24, with the first diameter bore 27 extending to a second diameter bore 28 within the body cavity 20. The second diameter bore 28 is greater in diameter than the first diameter bore 27. In addition and the second diameter bore 28 and the first diameter bore 27, are coaxially aligned along the axis 26, with the second diameter bore 28 being coextensive with the graduations 16 for consistency of indication of fluid expansion within the body cavity 20 for proper viewing and reading of fluid within the body cavity 20.

While it is contemplated that the sight member 14 be formed of a polymeric material of heat resistant characteristic, such is not mandated and other suitable materials available for the purposes attended herewithin may be employed.

It is to be understood, however, that numerous characteristics and advantages of the present invention have been set forth in the foregoing description, together with the details of the structure and function of the invention, the disclosure is illustrative only. Changes may be made in detail, especially in matter of shape, size, or arrangement of parts within the principles of the invention to the full extent indicated by the broad general meaning of the terms in which the appended claims are expressed.

What is claimed is:

1. A pump lubrication expansion tube, comprising in combination,
    a pump member, the pump member having an exterior wall, and the exterior wall having a bore extending through the exterior wall in communication with a pump crankcase chamber within the pump member, and
    a sight member formed of a transparent or a translucent material, the sight member directed into selective securement with the bore, and the sight member projecting beyond the pump exterior wall, wherein the sight member further comprises:
    a body portion, the body portion having an exterior surface, the exterior surface including a series of graduations extending therealong, with the body portion having a body first end spaced from a body second end, said body portion having a body cavity extending between the body first end and the body second end and a projecting boss for selective securement to the bore of the pump member, with the body cavity having a first diameter bore and a second diameter bore, with the first diameter bore extending along the projecting boss and the second diameter bore being greater in diameter than the first diameter bore, with the graduations being coextensive with the second diameter bore and extending between the body first end and the body second end.

2. A pump lubrication expansion tube as in claim 1 with a first end bore extending into the sight member from the body first end in communication with the body cavity, with a cap selectively securable to the sight member, with the cap selectively securable within the first end bore.

3. A pump lubrication expansion tube as set forth in claim 2 with a first sealing ring extending between the cap and the body first end and captured between the cap and the body first end when the cap is secured to the sight member.

4. A pump lubrication expansion tube as in claim 3 with the body cavity symmetrically oriented along a predetermined axis, and the graduations oriented parallel to the axis.

5. A pump lubrication expansion tube, said tube having a body member, the body member including an exterior surface, and the body member having a body first end spaced from a body second end, with a first end bore extending into the body member from the body first end, and a cap selectively securable to the body member and received within the first end bore,
    wherein the body member is formed of a transparent or translucent material and having graduations oriented along the body member extending between the body first end and the body second end,
    wherein the body member includes a projecting boss extending from the body second end and a body cavity extending between the body first end and the body second end, and said body cavity includes a first diameter bore and a second diameter bore, wherein the first diameter bore extends along the projecting boss, and the first diameter bore is in direct communication with the second diameter bore, and the second diameter bore is substantially greater in diameter than said first diameter bore.

6. A pump lubrication expansion tube as set forth in claim 5 wherein said projecting boss comprises external threads for selective securement to a pump member, and a sealing ring extends about the projecting boss.

7. A pump lubrication expansion tube as set forth in claim 5 wherein the body member is symmetrically oriented about a predetermined axis, and the graduations are oriented parallel to said axis.

8. A pump lubrication expansion tube comprising,
    a pump member, said pump member having an exterior wall and having a crankcase chamber, and
    sight means selectively secured to said exterior wall and in communication with said crankcase chamber,
    wherein said sight means includes a translucent body having a body first end spaced from a body second end, and a body cavity directed between the body first end and the body second end, and an array of graduations mounted to said body between said body first end and said body second end;
    wherein said body second end includes a projecting boss for selective securement to said pump members,
    wherein said body cavity includes a first diameter bore extending along the projecting boss, and a second diameter bore in communication with said first diameter bore, and the second diameter bore having a first diameter being less than said second diameter, and wherein the second diameter bore is coextensive with said graduations.

9. A pump lubrication expansion tube as set forth in claim 8 wherein said sight means further includes a cap means for selectively securing to said body first end and for selective mounting to said body first end for removal relative thereto permitting access to said body cavity.

10. A pump lubrication expansion tube as in claim 9 wherein said sight means includes a first sealing ring mounted between said cap means and said body first end.

11. A pump lubrication expansion tube, comprising in combination,
    a pump member, the pump member having an exterior wall, and the exterior wall having a bore extending through the exterior wall in communication with a pump crankcase chamber within the pump member, and a sight member formed of a translucent or transparent material, the sight member directed into selective securement with the bore of the pump member, and the sight member projecting beyond the exterior wall, wherein the sight member includes a body portion, the body portion having a body first end spaced from a body second end, wherein a body cavity extends continuously between the body first end and the body second end, with a first end bore extending into the sight member from the body first end and being in direct communication with the body cavity, a cap selectively securable to the sight member within the first end bore, wherein said body second end includes a projecting boss for selective securement to the bore of the pump member, wherein the body cavity further comprises a first diameter bore and a second diameter bore, the first diameter bore extending along the projecting boss and being continuous with the second diameter bore; and the second diameter bore being greater in diameter than the first diameter bore.

12. A pump lubrication expansion tube as set forth in claim 11, wherein the body portion is formed of a translucent material and having an exterior surface, the exterior surface having a series of graduations extending between the body first end and the body second end.

13. A pump lubrication expansion tube, said tube having a body member, the body member including an exterior surface, and the body member having a body first end and a body second end which includes a projecting boss for selective securement to said pump member, wherein the body member is symmetrically oriented about a predetermined axis and further includes a body cavity extending continuously between the body first end and the body second end;

said body cavity comprising a first diameter bore and a second diameter bore, wherein the first diameter bore extends from the projecting boss and is aligned with and continuous with the second diameter bore, wherein the second diameter bore is substantially greater in diameter than the first diameter bore.

14. The pump lubrication expansion tube as set forth in claim 13 wherein the body member further includes a cap means for selectively mounting to said body first end for removal relative thereto permitting access to said body cavity.

15. The pump lubrication expansion tube as set forth in claim 13 wherein the body member further comprises graduations oriented about the body member and extending between the body first end and the body second end.

16. The pump lubrication expansion tube as set forth in claim 13, further comprising an array of graduations oriented coextensively with said second diameter bore.

* * * * *